Figure 3:
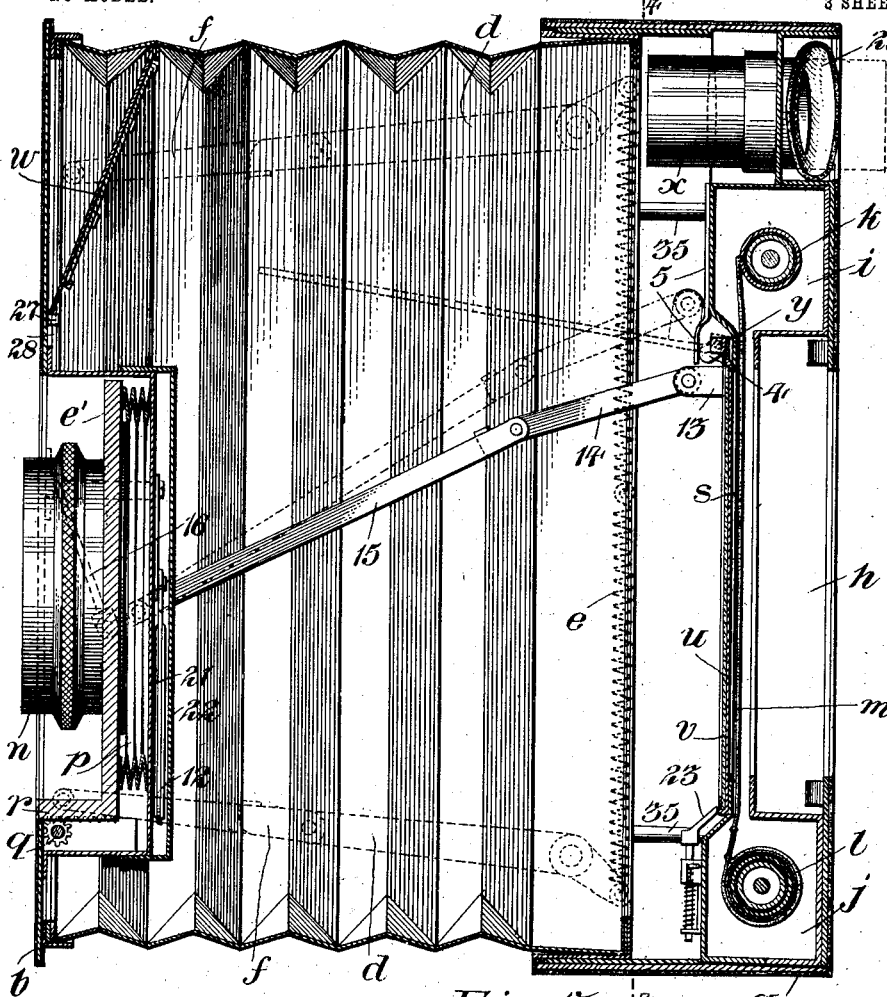

No. 741,102. PATENTED OCT. 13, 1903.
L. BORSUM.
PHOTOGRAPHIC CAMERA.
APPLICATION FILED OCT. 28, 1902.
NO MODEL. 3 SHEETS—SHEET 1.
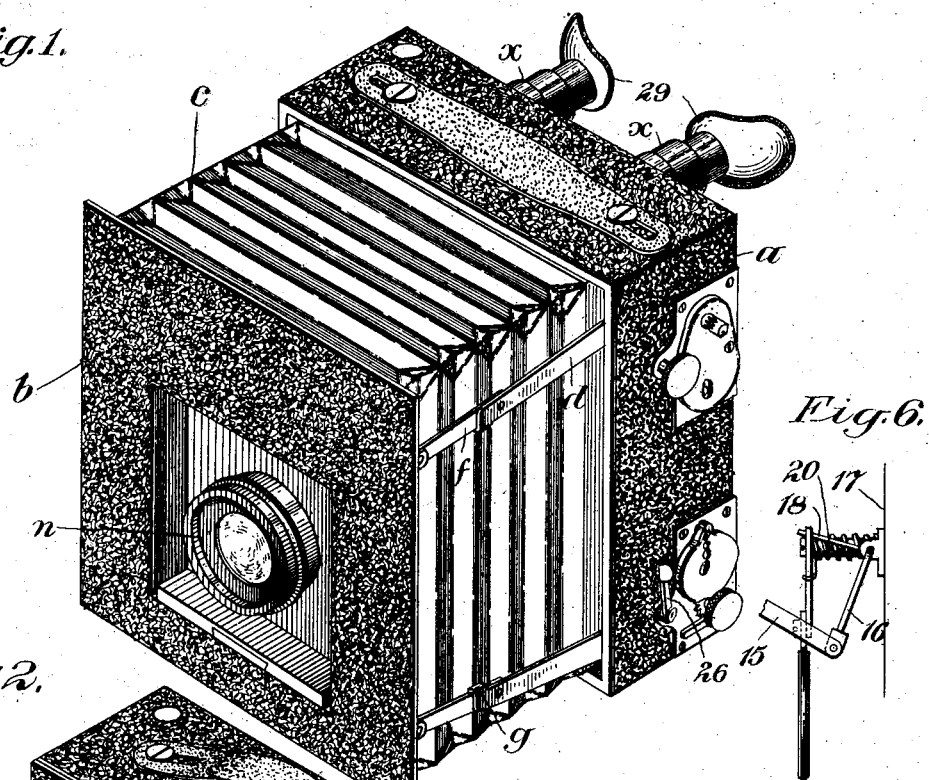
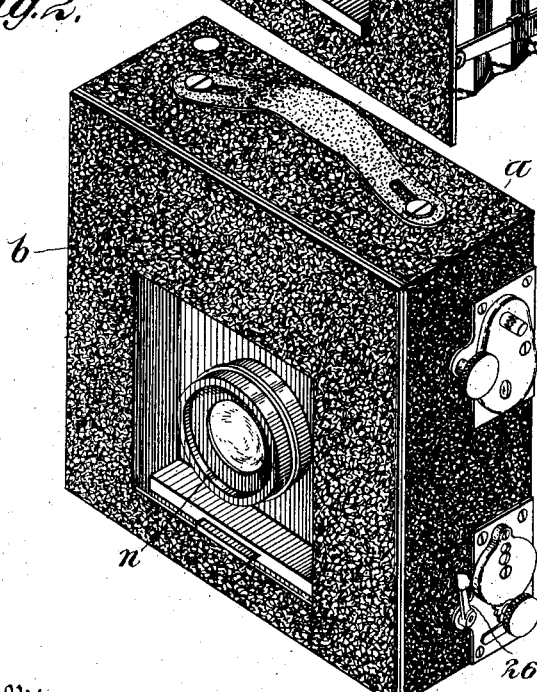
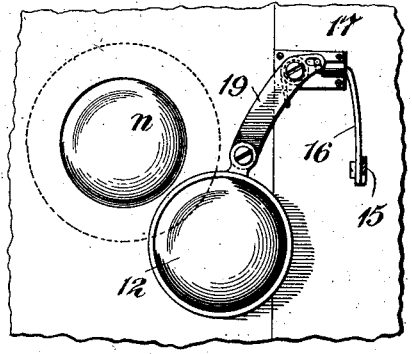

No. 741,102. PATENTED OCT. 13, 1903.
L. BORSUM.
PHOTOGRAPHIC CAMERA.
APPLICATION FILED OCT. 28, 1902.
NO MODEL. 3 SHEETS—SHEET 2.

WITNESSES:
W. P. Stahlin
L. F. Browning

INVENTOR
Louis Borsum
by Baldwin, Davidson & Wight
ATTORNEYS.

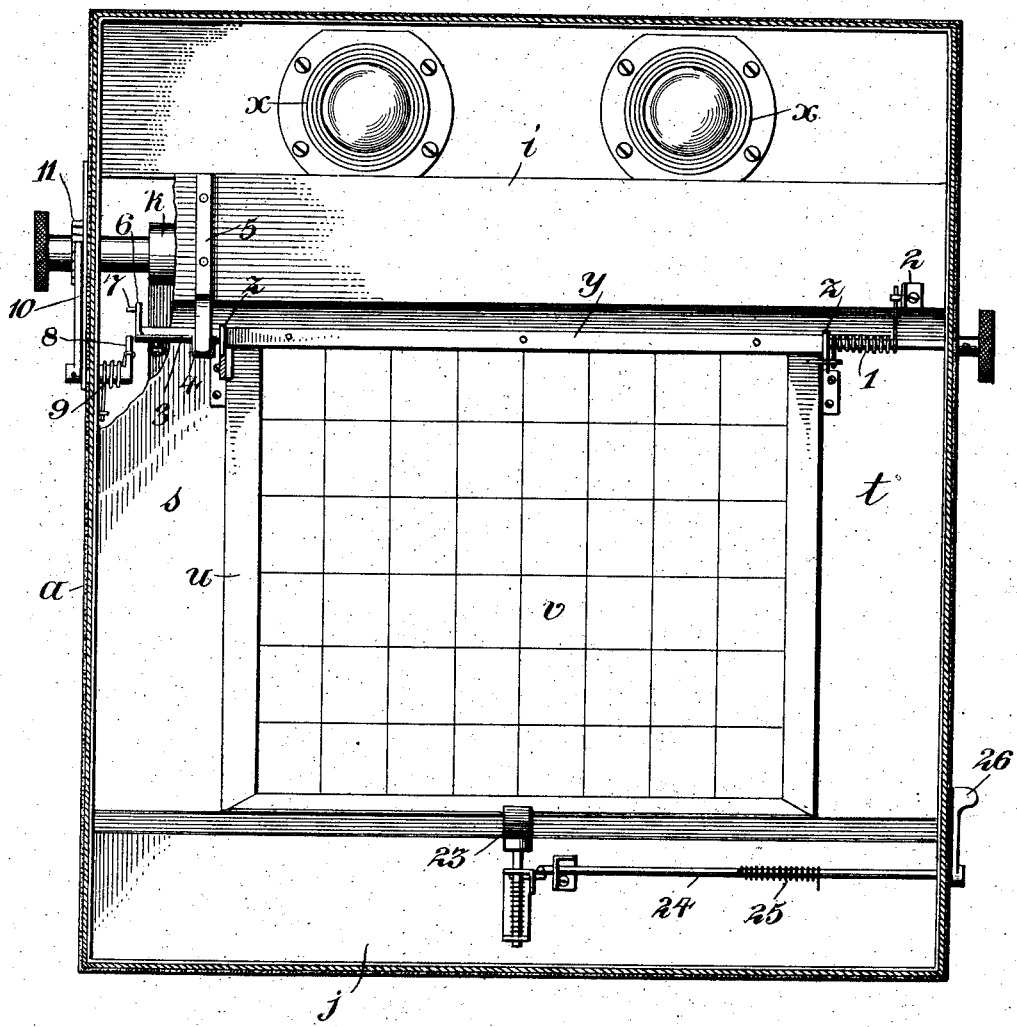

No. 741,102. Patented October 13, 1903.

UNITED STATES PATENT OFFICE.

LOUIS BORSUM, OF PLAINFIELD, NEW JERSEY.

PHOTOGRAPHIC CAMERA.

SPECIFICATION forming part of Letters Patent No. 741,102, dated October 13, 1903.

Application filed October 28, 1902. Serial No. 129,104. (No model.)

*To all whom it may concern:*

Be it known that I, LOUIS BORSUM, a citizen of the United States, residing in Plainfield, county of Union, State of New Jersey, have invented certain new and useful Improvements in Photographic Cameras, of which the following is a specification.

This invention relates to a camera having a surface upon which the image is focused arranged in front of and parallel with the plate-holder, means being provided for observation of the focused image. When a picture is properly focused upon the image-receiving surface, it is moved out of the path of light and the plate exposed.

In the construction herein disclosed, which experience has demonstrated to be a practical and efficient form of my invention, the observation opening or openings are in the rear wall of the camera-case above the plate-holder chamber and are equipped with eyepieces having telescoping tubes and containing glasses adapted to the eyes of the operator. Opposite the openings is a mirror in which is reflected the image formed by the lens upon the image-receiving surface. Where an exposure is to be made, the image-receiving surface, which is the flat face of a hinged plate or frame, is swung out of the way and the shutter then tripped. When the plate is hinged at its upper edge, as herein shown, it serves when in its elevated position as a screen to protect the exposed plate against reflection of rays of light that might enter at the eyepieces. The eyepieces are so shaped as to substantially exclude all light when the operator's eyes are applied thereto, thereby affording a sharp view of the reflected image, protecting the plate at the moment of exposure, and rendering it unnecessary to close the observation-openings at the time of exposure. In such a camera it is preferable that the actuation of a single device should effect the movement of the image-receiving surface away from the plate and then the tripping of the shutter. Since in a camera of this kind unnecessary complications would be introduced by the use of a lens-shutter, I employ a focal-plane shutter and deem it to be far more satisfactory. The plate-holder chamber, image-receiving surface, and focal-plane shutter, where such a shutter is used, are carried by a casing or a box forming the rear of the camera, to which is attached one end of a bellows or collapsible light-tight structure, the outer end of which is connected with a frame or board carrying the lens and constituting the front part of the camera. Such a construction is capable of being collapsed or folded into small space and readily extended for use. With such an organization I combine in the present invention means for adjusting the focal length of the lens or objective to properly focus the image upon the receiving-surface and also upon the more distant sensitive plate. For this purpose I employ a compensating or secondary lens, coöperating with the objective and capable of adjustment or manipulation to effect a change of focal length of the objective corresponding with the distance between the plane of the image-receiving surface and that of the sensitive plate. The secondary lens is placed in rear of the objective and the devices for operating it are inclosed within the bellows. It is of course preferable that the secondary or compensating lens shall be operated on the actuation of the same device that causes movement of the image-receiving surface out of the path of light and actuation of the shutter. The means of moving the secondary lens should, of course, be such as to permit collapsing and extension of the camera, and I prefer to employ a jointed rod applied to the frame or plate of the image-receiving surface and connected to the devices for operating the secondary lens, the organization being such that the rod folds to permit collapse of the camera. The mirror in which the image on the receiving-surface is reflected may be carried entirely by the front board or frame of the camera or (without excluding the idea of still other arrangements) partly or wholly by the telescoping or collapsing light-tight structure uniting the front and rear members of the camera-box, and where the observation-apertures are located in the rear wall of the camera-box above the plate-holding chamber the mirror should be located opposite them and above the lens.

The accompanying drawings show an embodiment of this invention that experience has demonstrated to be practical and efficient; but the structural details may be varied by those skilled in the art without departing from the principles of the invention.

Figure 7:
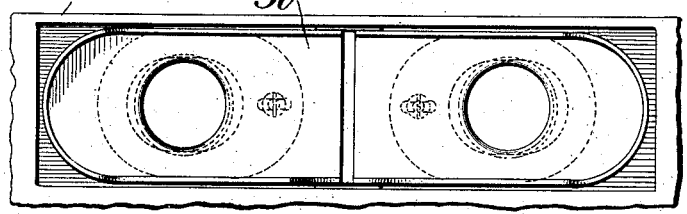
Figure 8:
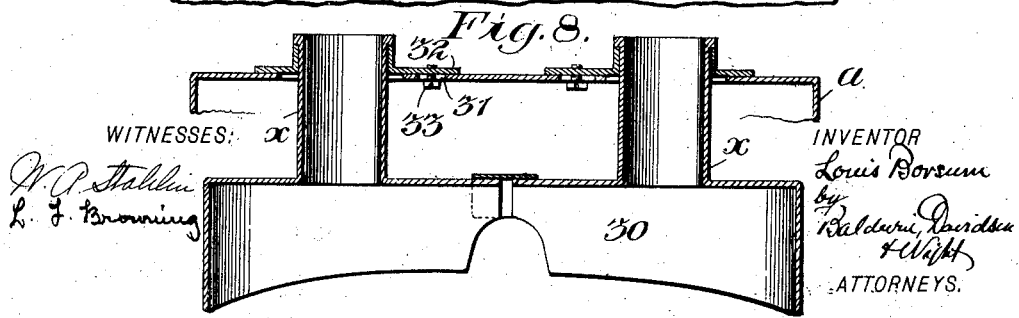

Figure 1 is a perspective view showing the camera extended for use; Fig. 2, a similar view showing it collapsed; Fig. 3, a vertical longitudinal section; Fig. 4, a transverse section on the line 4 4 of Fig. 3. Fig. 5 is a detail elevation showing the secondary lens and the way in which it is mounted and operated; Fig. 6, a side elevation of the devices shown in Fig. 5. Figs. 7 and 8 show a modification in the construction of the eyepieces applied at the observation-openings.

The camera casing or box is shown as composed of rear and front members $a$ $b$. Member $a$ is in the form of a box within the open face of which is attached one end of a collapsing structure $c$, connecting the two members and shown in this instance as a bellows. On the inside of each side wall of the member $a$ is pivoted a pair of levers $d$, whose inner ends are connected by a coiled spring $e$, tending to throw their respective outer ends up and down. Near the outer ends of these levers are hinged links $f$, pivoted on the front member $b$ and against the sides of which when the camera is extended lips $g$ on the levers $d$ bear. When the front member is pulled entirely out, the springs $e$, coöperating with the lips $g$, hold the jointed connections $d f$ rigid, and by flexing these connections toward each other the camera may be collapsed. In the rear member of the casing is formed by suitable partitions a plate-holder chamber $h$ and above and below it chambers $i j$ for the upper and lower rolls $k l$ of the curtain or shutter $m$. The lens or objective $n$ is mounted upon the lens-board $e'$, located in a chamber countersunk in the front face of the member $b$ and connected by a collapsing bellows $p$ with the rear wall of such chamber. Adjustment of the lens may be afforded by means of a pinion $q$ on a shaft extending to the outside of the camera and engaging a rack on the bottom of the base $r$ of the lens-board. In front of and normally closing the opening between the upper and lower shutter-roll chambers $i j$ and side light-guards $s t$ is hinged at its upper edge a plate or frame $u$, having a flat surface facing the lens of such character as to have plainly formed on it the picture to be taken. This surface may be provided by inserting in the face of the plate or frame a piece of white cardboard $v$, whose face may be divided into squares by vertical and horizontal lines. This surface, however, may be of other color, material, and character. Preferably it should have a dead surface. Its required characteristics are such that the image formed thereon may clearly and sharply and with sufficient light be reflected in the mirror $w$, so that it may be properly seen through the eyepieces $x$. The plate or frame $u$ is shown as attached to a rod $y$, turning in bearings in brackets $z z$, attached above the exposure-opening. A spring 1, coiled around the shaft, has one end attached to a bracket 2 and the other bearing against a lug or arm projecting laterally from the frame $u$ and normally tends to lift the frame into the position shown by dotted lines in Fig. 3, in which it acts as a screen to prevent rays of light, should any enter at the eyepieces, being reflected upon the exposed sensitive plate. At the other end of shaft $y$ is a sleeve 3, adjustably secured thereon by a set-screw, and on it is a rounded projection 4, upon which bears a plate-spring 5, that acts as a cushion or check to the swinging frame as it reaches its uppermost position. On the end of the sleeve is a radially-projecting arm 6, from which extends laterally or parallel with the rod $y$ a pin 7, that as the plate or frame $u$ approaches or reaches its uppermost position strikes an arm 8 on a rock-shaft 9, extending through the side wall of the casing $a$ and having on its outer end a locking-pawl 10, that engages the usual toothed wheel 11 on the shaft of the upper shutter-roll, thereby tripping the shutter. In the construction shown the secondary lens is mounted in a vibratable arm, so that in one position of the arm the axes of the two lenses coincide and in another the secondary lens is moved laterally out of the path of light-rays. Experience has shown that this is a suitable and practicable way of effecting the requisite focal-length adjustment. Immediately preceding the tripping of the shutter, however, the secondary or compensating lens 12 is moved away from the objective $n$, and this may be accomplished in the following manner: On a projection 13 at one side of the plate or frame $u$ and near its upper edge is pivoted a link 14, hinged to a link 15, extending toward the front board or frame $b$ and there hinged to the long arm 16 of a crank-lever having its bearing in a boss or projection on a plate 17, mounted on the front board $b$, and whose other end 18 extends rearwardly and engages a slot in one end of a lever 19, pivoted on a post 20, projecting from the board $b$, and carrying at its outer free end the secondary lens 12, arranged to vibrate between the frame-plates 21 22, forming the back of the countersunk chamber in the front board $b$. When the frame $u$ is in its normal position parallel with the plate-holder and closing the exposure-opening, the action of these devices is to hold the secondary lens 12 opposite the objective $n$. When the part $u$ is released and thrown upward, it draws the link connection 14 15 rearwardly, and the secondary lens 12 is carried down into the position indicated in Fig. 5, after which the operation of tripping the shutter occurs. The plate or frame $u$ is held in its normal position, so that the receiving-surface thereon is parallel with the plate-holding chamber by a spring-latch 23, controlled by a crank-rod 24, having applied to it a spring 25 and on its outer end a radial arm or thumb-piece 26, which may be manipulated by the operator at will to release the latch from the plate and permit the latter to rise under the influence of its spring 1.

In the construction shown the mirror $w$ is supported at its lower edge by several projecting fingers 27, that slide in slots in brackets 28, attached to the front board $b$, and at its upper edge is flexibly connected with the bellows or collapsible structure $c$, as indicated in Fig. 3. When the camera is collapsed, the fingers 27 slide downwardly in their lips and the mirror moves toward the front board $b$. The hinged joint of the links 14 15 naturally moves upwardly to permit the approach of the front plate toward the rear member $a$. Opposite the mirror observation-apertures are formed in the countersunk upper part of the rear wall of the part $a$ of the casing and in them are fitted eyepieces $x$, having collapsing or telescopic frames or tubes containing glasses adapted to the eyes of the operator and formed with enlarged or flaring outer ends 29, so curved and shaped as to fit closely around the eyes of the operator to exclude light, thereby permitting a better view of the reflected image while excluding extraneous rays of light from the interior of the camera. The eyepiece-tubes may be adjusted toward and from each other, as in Figs. 7 and 8, which also illustrate the use in lieu of separate end pieces 29 of a single end piece or cover 30 for both eyes shaped to conform to the face of the operator. The adjustment of the axes of the eyepieces may be effected by providing slots 31 in the rear wall of the casing $a$ and fitting to slide on the rear face of said wall and cover the slots, plates 32 carrying set-screws 33. Of course the special end pieces 29 or the part 30 may be omitted and instead ordinary telescoping eyepieces be used, or the eyepieces may be omitted and the reflected image be viewed merely through the apertures in the rear wall of the case $a$, which preferably, however, contain eyeglasses suited to the user and which act to completely close the casing against dust. When the camera is collapsed, as in Fig. 2, inward movement of the front plate or frame is limited by posts 35, that may be secured either to the front member $b$ or to the rear member $a$. When the eyepieces are pushed in, their end pieces 29 (or end piece 30) are contained within the countersunk chamber, as seen in Fig. 3.

In the embodiment of this invention which the drawing illustrates there is a chamber adapted to receive a plate-holder. The invention is not restricted to that type of camera.

In my Patent No. 720,217, dated February 10, 1903, I have shown a camera in some respects resembling that herein disclosed and in which a proper focus of the picture to be taken first upon the image-receiving surface and then upon the photographically-sensitive surface is effected by a movement of either the lens or plate-holding chamber, so that the distance between the lens and the image-receiving surface at the time of focusing shall be the same as the distance between the lens and the photographically-sensitive surface at the time of exposure. In such a camera many of the features of construction herein described may be employed and are not, therefore, dependent upon the use of a compensating or secondary lens.

I claim as my invention—

1. A photographic camera having an image-receiving surface normally closing the opening through which the photographically-sensitive surface is exposed, a mirror in front of the image-receiving surface in which is reflected the image formed thereon, and which is viewed through an observation-aperture in the rear wall of the camera-casing, means for moving the image-receiving surface out of the path of light when the photographically-sensitive surface is to be exposed, and a movable compensating lens coöperating with the objective to change its focal length and thereby effect a proper focus of the picture both upon the image-receiving and photographically-sensitive surfaces.

2. A photographic camera comprising a rear member containing a photographically-sensitive film or plate exposing chamber, a focal-plane shutter located in front of the opening thereinto, a movable part normally arranged in front of the focal-plane shutter and having a surface upon which the picture is focused, a front member carrying the objective, a collapsible structure connecting the front and rear members, means for observing the image formed upon the image-receiving surface, and a movable compensating lens coöperating with the objective to change its focal length and thereby afford a proper focus upon both the image-receiving and photographically-sensitive surfaces.

3. A photographic camera comprising a front member containing a chamber for the photographically-sensitive plate or film, a focal-plane shutter normally closing the exposure-opening thereinto, a part having an image-receiving surface normally located in front of the shutter and parallel with the photographically-sensitive surface but adapted to be moved out of the path of light when an exposure is to be made, a front member carrying the objective, a collapsible structure connecting the front and rear members, a mirror in front of the image-receiving surface and which is viewed through an observation-aperture in the wall of the camera, and a movable compensating lens coöperating with the objective to change its focal length to afford a proper focus of the picture both upon the image-receiving and the photographically-sensitive surfaces.

4. A photographic camera comprising a front member containing an exposure-chamber for the photographically-sensitive plate or film, a focal-plane shutter arranged in front thereof, a part arranged in front of the shutter, hinged at its upper edge and having an image-receiving surface normally parallel with the photographically-sensitive surface, a front member carrying an objective, a collapsible structure uniting the two members, a mirror in front of the image-receiving surface in which is reflected the image formed thereon and which is viewed through an observation-aperture in the wall of the camera, a movable compensating lens coöperating with the objective to change its focal length and thereby afford a proper focus both on the image-receiving and the photographically-sensitive surfaces and means on the actuation of which the image-receiving surface is moved out of the path of light, the compensating lens operated and the shutter tripped.

5. A photographic camera comprising a front member containing an exposure-chamber for the photographically-sensitive plate or film, a focal-plane shutter arranged in front thereof, a part arranged in front of the shutter, hinged at its upper edge and having an image-receiving surface normally parallel with the photographically-sensitive surface, a front member carrying an objective, a collapsible structure uniting the two members, a mirror in front of the image-receiving surface in which is reflected the image formed thereon and which is viewed through an observation-aperture in a countersunk rear wall of the front member, a collapsing eyepiece at the aperture through which the image reflected in the mirror is observed, a movable compensating lens coöperating with the objective to change its focal length and thereby afford a proper focus both on the image-receiving and the photographically-sensitive surfaces and means on the actuation of which the image-receiving surface is moved out of the path of light, the compensating lens operated and the shutter tripped.

6. A photographic camera comprising a front member containing a sensitive plate or film exposure chamber, a part having an image-receiving surface normally parallel with and in front of the photographically-sensitive surface movable out of the path of light when an exposure is to be made, a front member carrying the objective, a collapsible structure connecting the two members, a movable compensating lens coöperating with the objective, operative connections between the movable part having the image-receiving surface and the compensating lens, a mirror in which is reflected the image formed on the image-receiving surface and which is viewed through an observation-aperture in a wall of the camera, a shutter, means for moving the image-receiving surface out of the path of light and thereby operating the compensating lens and means for tripping the shutter.

7. In a photographic camera, the combination of the front and rear members of the casing, a collapsible structure connecting them, jointed links connecting the front and rear members, springs acting thereon, an objective and a compensating lens carried by the front member, a movable image-receiving surface carried by the rear member, a mirror in which such surface is reflected and which is viewed through an observation-aperture in the wall of the camera and means for moving the image-receiving surface out of the path of light and adjusting the compensating lens.

8. In a photographic camera, the combination of the rear member of the casing containing a sensitive plate or film exposing chamber and having a part with an image-receiving surface normally closing the opening to the exposure-chamber but movable out of the path of light when an exposure is to be made, the front member of the casing carrying the objective and a movable compensating lens arranged in rear of the objective and coöperating therewith, means for observing the image focused on the image-receiving surface, a shutter, and means for moving the image-receiving surface out of the path of light, adjusting the compensating lens and tripping the shutter.

9. In a photographic camera, the combination of the rear member of the casing having an observation-aperture in its wall and containing a sensitive plate or film exposing chamber and having a part with an image-receiving surface normally closing the opening to the exposure-chamber but movable out of the path of light when an exposure is to be made, the front member of the casing, a collapsible structure connecting the said front and rear members, an objective and movable compensating lens in rear of the objective carried by the front member, a mirror arranged in front of the image-receiving surface and viewed through said aperture, a shutter, and means for moving the image-receiving surface out of the path of light, adjusting the compensating lens and tripping the shutter.

10. In a photographic shutter, the combination of the rear member of the casing having an observation-aperture in its wall and containing a sensitive plate or film exposing chamber and having a part with an image-receiving surface normally closing the opening into said chamber but movable out of the path of light when an exposure is to be made, the front member of the casing, a collapsible structure connecting said front and rear members, an objective carried by the front member, a compensating lens arranged in rear of and coöperating with the objective, a mirror arranged in front of the image-receiving surface and observable through said observation-aperture, a shutter, means for moving the part having the image-receiving surface out of the path of light, and means actuated by said part for adjusting the compensating lens and tripping the shutter.

11. In a photographic camera, the combination of the rear member of the casing having an observation-aperture in its wall and containing a sensitive plate or film exposing chamber and having a part with an image-receiving surface normally closing the opening to the exposing-chamber but movable out of the path of light when an exposure is to be made, the front member of the casing, a collapsible structure connecting the said front and rear members, two lenses, one an objective and the other a compensating lens, a mirror in front of the image-receiving surface and viewed through said aperture, a shutter, and means for moving the image-receiving surface out of the path of light, adjusting one of said lenses for the purpose set forth, and tripping the shutter.

12. In a photographic camera, the combination of the rear member of the casing having an observation-aperture in its wall and containing a sensitive plate or film exposing chamber and having a part with an image-receiving surface normally closing the opening to the exposure-chamber but movable out of the path of light when an exposure is to be made, the front member of the casing, a collapsible structure connecting the front and rear members, two lenses, one an objective and the other a compensating lens arranged in rear of the objective, both carried by said front member, the mirror in front of the image-receiving surface and viewed through said observation-aperture, a shutter, and means for moving the image-receiving surface out of the path, adjusting one of said lenses, for the purpose set forth, and tripping the shutter.

In testimony whereof I have hereunto subscribed my name.

LOUIS BORSUM.

Witnesses:
EDWARD C. DAVIDSON,
W. R. STAHLIN.